(12) United States Patent
Wang et al.

(10) Patent No.: US 10,146,958 B2
(45) Date of Patent: Dec. 4, 2018

(54) PRIVACY PRESERVING STATISTICAL ANALYSIS ON DISTRIBUTED DATABASES

(71) Applicant: Mitsubishi Electric Research Laboratories, Inc., Cambridge, MA (US)

(72) Inventors: Ye Wang, Andover, MA (US); Bing-Rong Lin, State College, PA (US); Shantanu Rane, Cambridge, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 332 days.

(21) Appl. No.: 13/804,701

(22) Filed: Mar. 14, 2013

(65) Prior Publication Data

US 2014/0281572 A1    Sep. 18, 2014

(51) Int. Cl.
*G06F 21/62* (2013.01)
*H04L 9/00* (2006.01)
*H04L 9/06* (2006.01)

(52) U.S. Cl.
CPC ............ *G06F 21/6254* (2013.01); *H04L 9/00* (2013.01); *H04L 9/0656* (2013.01); *H04L 2209/42* (2013.01)

(58) Field of Classification Search
CPC .. G06F 21/72; G06F 21/10; G06F 2221/2107; G06F 21/60; G06F 21/6254; G06F 21/6245; H04L 9/08; H04L 63/0428; H04L 63/1408
See application file for complete search history.

(56) References Cited

U.S. PATENT DOCUMENTS

| | | | | |
|---|---|---|---|---|
| 8,555,400 | B2* | 10/2013 | Shi ........................ | H04L 9/3006 380/277 |
| 8,893,292 | B2* | 11/2014 | Wang .................. | G06F 21/6254 726/26 |
| 2011/0179011 | A1* | 7/2011 | Cardno et al. ................ | 707/709 |
| 2012/0204026 | A1* | 8/2012 | Shi et al. ...................... | 713/155 |
| 2012/0254605 | A1* | 10/2012 | Sun et al. ..................... | 713/150 |

(Continued)

OTHER PUBLICATIONS

Shi, E.; Chan, H.; Rieffel, E.; Chow, R.; Song, D. Privacy-preserving aggregation of time-series data. 18th Annual Network & Distributed System Security Symposium (NDSS); Feb. 6-9, 2011; San Diego, CA.*

(Continued)

*Primary Examiner* — Samson B Lemma
*Assistant Examiner* — Carlos E Amorin
(74) *Attorney, Agent, or Firm* — Gene Vinokur; James McAleenan; Hironori Tsukamoto (57) ABSTRACT

Aggregate statistics are securely determined on private data by first sampling independent first and second data at one or more clients to obtain sampled data, wherein a sampling parameter substantially smaller than a length of the data. The sampled data are encrypted to obtain encrypted data, which are then combined. The combined encrypted data are randomized to obtain randomized data. At an authorized third-party processor, a joint distribution of the first and second data is estimated from the randomized encrypted data, such that a differential privacy requirement of the first and second is satisfied.

11 Claims, 5 Drawing Sheets

(56) References Cited

U.S. PATENT DOCUMENTS

| | | | |
|---|---|---|---|
| 2012/0254606 A1* | 10/2012 | Sun et al. | 713/150 |
| 2012/0254612 A1* | 10/2012 | Rane et al. | 713/168 |
| 2013/0145473 A1* | 6/2013 | Cormode | G06F 21/10 |
| | | | 726/26 |
| 2013/0212690 A1* | 8/2013 | Fawaz | G06F 21/60 |
| | | | 726/26 |
| 2014/0196151 A1* | 7/2014 | Mishra | G06F 17/30569 |
| | | | 726/26 |
| 2015/0235051 A1* | 8/2015 | Fawaz | G06F 21/6245 |
| | | | 726/26 |
| 2015/0286827 A1* | 10/2015 | Fawaz | H04L 9/00 |
| | | | 726/26 |
| 2016/0224735 A1* | 8/2016 | Ayday | G06F 19/322 |

OTHER PUBLICATIONS

Rastogi, Vibhor, and Suman Nath. "Differentially private aggregation of distributed time-series with transformation and encryption." Proceedings of the 2010 ACM SIGMOD International Conference on Management of data. ACM, 2010.*

Evfimievski, Alexandre Valentinovich. Privacy preserving information sharing. Diss. Cornell University, 2004.*

* cited by examiner

PRIVACY PRESERVING STATISTICAL ANALYSIS ON DISTRIBUTED DATABASES

RELATED APPLICATION

U.S. patent application Ser. No. 13/676,528, "Privacy Preserving Statistical Analysis for Distributed Databases," filed Nov. 14, 2012 by Wang et al., incorporated herein by reference. That Application determines aggregate statistics by randomizing data from two sources for a server, which computes an empirical distribution, specifically a conditional and joint distribution of the data, while maintaining privacy of the data.

FIELD OF THE INVENTION

This invention relates generally to secure computing, and more particularly to performing secure aggregate statistical analysis on a private data by a third party.

BACKGROUND OF THE INVENTION

One of the most noticeable technological trends is the emergence and proliferation of large-scale distributed databases. Public and private enterprises are collecting tremendous amounts of data on individuals, their activities, their preferences, their locations, spending habits, medical and financial histories, and so on. These enterprises include government organizations, health providers, financial institutions, Internet search engines, social networks, cloud service providers, and many others. Naturally, interested parties could potentially discern meaningful patterns and gain valuable insights if they were able to access and correlate the information across the databases.

For example, a researcher may want to determine the correlations between individual income with personal characteristics such as gender, race, age, education, etc., or a medical researcher may want to study the relationships between disease prevalence and individual environmental factors. In such applications, it is imperative to maintain the privacy of individuals, while ensuring that the useful aggregate statistical information is only revealed to the authorized parties. Indeed, unless the public is satisfied that their privacy is being preserved, they would not provide their consent for the collection and use of their personal information. Additionally, the inherent distribution of this data across multiple databases present a significant challenge, as privacy concerns and policy would likely prevent direct sharing of data to facilitate statistical analysis in a centralized fashion. Thus, tools must be developed for preforming statistical analysis on large and distributed databases, while addressing these privacy and policy concerns.

It is known that conventional mechanisms for privacy, such as k-anonymization do not provide adequate privacy. Specifically, an informed adversary can link an arbitrary amount of side information to anonymized database, and defeat the anonymization mechanism. In response to vulnerabilities of simple anonymization mechanisms, a stricter notion of privacy, known as differential privacy, has been developed. Informally, differential privacy ensures that the result of a function computed on a database of respondents is almost insensitive to the presence or absence of a particular respondent. A more formal way states that when the function is evaluated on databases, differing in only one respondent, the probability of outputting the same result is almost unchanged.

Mechanisms that provide differential privacy typically involve output perturbation, e.g., when Laplacian noise is added to the result of a function computed on a database, the noise provides differential privacy to the individual respondents in the database. Nevertheless, it can be shown that input perturbation approaches, such as the randomized response mechanism, where noise is added to the data, also provide differential privacy to the respondents.

It is desired to protect the privacy of individual respondents in a database, to prevents unauthorized parties from computing a joint or marginal empirical probability distributions of the data, and to achieves a superior tradeoff between privacy and utility compared to simply performing post randomization (PRAM) on the database.

Sampling can be used for crowd-blending privacy. This is a strictly relaxed version of differential privacy, but it is known that a pre-sampling step applied to a crowd-blending privacy mechanism can achieve a desired amount of differential privacy.

The related application Ser. No. 13/676,528 first randomizes independently data X and Y to obtain randomized data $\hat{X}$ and $\hat{Y}$. The first randomizing preserves the privacy of the data X and Y. Then, the randomized data $\hat{X}$ and $\hat{Y}$ are randomized secondly to obtain randomized data $\tilde{X}$ and $\tilde{Y}$ for a server, and helper information $T_{\tilde{X}|\hat{X}}$ and $T_{\tilde{Y}|\hat{Y}}$ for a client, where T represents an empirical distribution, and where the randomizing secondly preserves the privacy of the aggregate statistics of the data X and Y. The server then determines statistics $T_{\tilde{X},\tilde{Y}}$. Last, the client applies the helper information $T_{\tilde{X}|\hat{X}}$ and $T_{\tilde{Y}|\hat{Y}}$ to $T_{\tilde{X},\tilde{Y}}$ to obtain an estimated $\hat{T}_{X,Y}$, wherein "|" and "," between X and Y represent a conditional and joint distribution, respectively.

SUMMARY OF THE INVENTION

The embodiments of the invention provide a method for obtaining aggregate statistics from client data stored at a server, while preserving the privacy of data. The data are vertically partitioned.

The method uses a data release mechanism based on post randomization (PRAM), encryption and random sampling to maintain the privacy, while allowing the server to perform an accurate statistical analysis of the data. The encryption ensures that the server obtains no information about the client data, while the PRAM and sampling ensures individual privacy is maintained against third parties receiving the statistics.

Means are provided to characterize how much the composition of random sampling with PRAM increases the differential privacy compared to using PRAM alone. The statistical utility of the method is analyzed by bounding the estimation error, i.e., the expected $l_2$ norm error between a true empirical distribution and an estimated distribution, as a function of the number of samples, PRAM noise, and other parameters.

The analysis indicates a tradeoff between increasing PRAM noise versus decreasing the number of samples to maintain a desired level of privacy $\varepsilon$. An optimal number of samples m* that balances this tradeoff and maximizes the utility is determined.

Our mechanism maintains the privacy of client data stored and analyzed by a server. We achieve this with a privacy mechanism involving sampling and post randomization (PRAM), which is a generalization of randomized response. The mechanism prevents unauthorized parties from computing the joint or marginal empirical probability distributions of the data. We achieve this using random encrypting pads, which can only be reversed by authorized parties. The mechanism achieves a superior tradeoff between privacy and utility compared to simply performing PRAM on the data.

Sampling the client data enhances privacy with respect to the individual respondents, while retaining the utility provided to an authorized third party interested in the joint and marginal empirical probability distributions.

We enhance differential privacy by sampling data uniformly at a fixed rate without replacement. We formulate privacy using the definition of differential privacy wherein neighboring (adjacent) databases differ by a single replacement rather than by a single addition or deletion. Furthermore, we consider vertically partitioned distributed databases, which are maintained by mutually untrusting clients. To compute joint statistics, a join operation is required on the databases, which implies that individual clients cannot independently blend their respondents without altering the joint statistics across all databases.

DETAILED DESCRIPTION OF THE PREFERRED EMBODIMENTS

Figure 1:
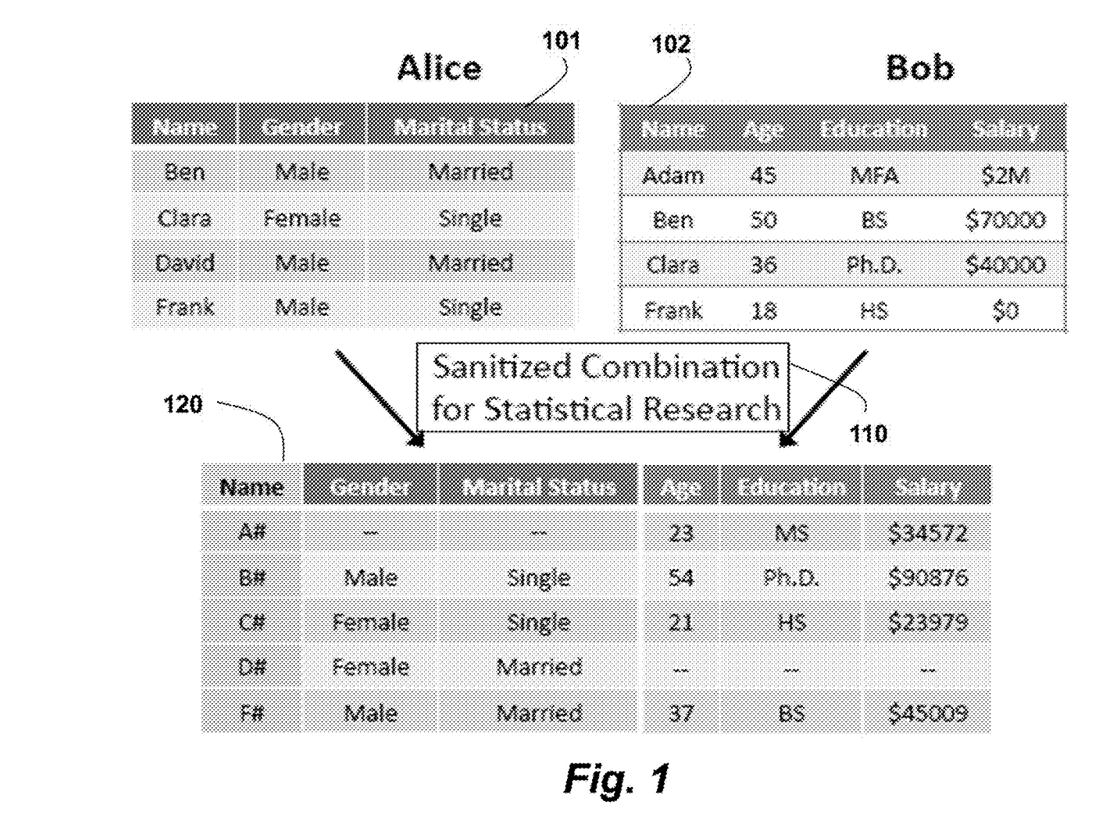
FIG. 1 is a block diagram of private data from two client sources operated on according to embodiments of the invention.

FIG. 1 shows two example databases 101-102 maintained by two clients Alice and Bob. Alice can Bob can share a single client, or the data can be distributed over the one or more clients. The databases contain census-type information about individuals.

The databases are sanitized and combined 110, and stored at a server 120 so that an authorized third party can analyze, e.g., salaries in the population, while ensuring that the privacy of the individual respondents is maintained. It is understood that other data can be maintained by the clients.

Conceptually, a data release mechanism involves the "sanitization" of the data, via some form of perturbation or transform, to preserve individual privacy, before making the data are made available to the server. The suitability of the method used to sanitize the data is determined by the extent to which rigorously defined privacy constraints are met.

The embodiments of our invention provide a method for obtaining aggregate statistics from the data stored at a server, while preserving the privacy of data.

Problem Formulation

In this section, we describe the general setup. The clients, Alice and Bob, wish to release their data to enable privacy-preserving data analysis by an authorized third party. For simplicity, we described our problem formulation and results for two clients. However, our methods can be generalized to more than two clients.

It should also be understood, that the third party can be an authorized third party accessing a third party processor. That is, the authorized third party directs the processor to perform certain functions. The third party also supplies the appropriate keys to the processor so that the processor can perform decryption as necessary. Therefore, the terms authorized third party and authorized third party processor as described herein are essentially synonymous. Those of ordinary skill in the arts would understand the actual computations are performed by the processor under the direction of the third party, Consider a data mining application in which Alice and Bob are mutually untrusting clients. The two databases are to be made available for a third party analysis with authorization granted by the clients, such that statistical measures can be computed either on the individual databases, or on some combination of the two databases. The clients should have flexible access control over the data. For example, if the third party is granted access by Alice but not by Bob, then the third party can only access Alice's data. In addition, the server should only host the data and not be able access the underlying information. Therefore, the data are sanitized, before released, to protect individual privacy.

We have the following privacy and utility requirements.

Database Security:

Only third parties authorized by the clients can extract statistical information from the database.

Respondent Privacy:

Individual privacy of the respondents related to the data is maintained against the server as well as the third parties.

Statistical Utility:

The authorized third party, i.e., one possessing appropriate keys, can compute joint and marginal distributions of the data provided by the clients.

Complexity:

The overall communication and computation requirements of the system should be reasonable.

In the following sections, we describe our system framework and formalize the notions of privacy and utility.

Type and Matrix Notation

The type, or empirical distribution of a sequence data $X^n$, is defined as a mapping $T_{X^n}: X \to [0,1]$ given by $$\forall x \in X, T_{X^n}(x) := \frac{|\{i: X_i = x\}|}{n}.$$

A joint type of two sequences $X^n$ and $Y^n$ is defined as a mapping $T_{X^n,Y^n}: X \times Y \to [0,1]$ given by $$\forall (x,y) \in X \times Y, T_{X^n,Y^n}(x,y) := \frac{|\{i: (X_i, Y_i) = (x,y)\}|}{n}.$$

For notational convenience, when working with finite-domain type/distribution functions, we drop the arguments to represent and use these functions as vectors and matrices. For example, we can represent a distribution function $P_X: X \to [0,1]$ as the $|X| \times 1$ column-vector $P_X$, with values arranged according to a fixed consistent ordering of X. Thus, with a slight abuse of notation, using the values of X to index the vector, the $x^{th}$ element of the vector $P_X[x]$, is given by $P_X(x)$. Similarly, a conditional distribution function $P_{Y|X}: Y \times X \to [0,1]$ can be represented as a $|Y| \times |X|$ matrix $P_{Y|X}$, defined by $P_{Y|X}[y,x] := P_{Y|X}(y|x)$. For example, by using this notation, the elementary probability identity $$\forall y \in Y, P_Y(y) = \sum_{x \in X} P_{Y|X}(y|x) P_X(x),$$

can be written in matrix form as $P_Y = P_{Y|X} P_X$.

System Framework

Figure 2:
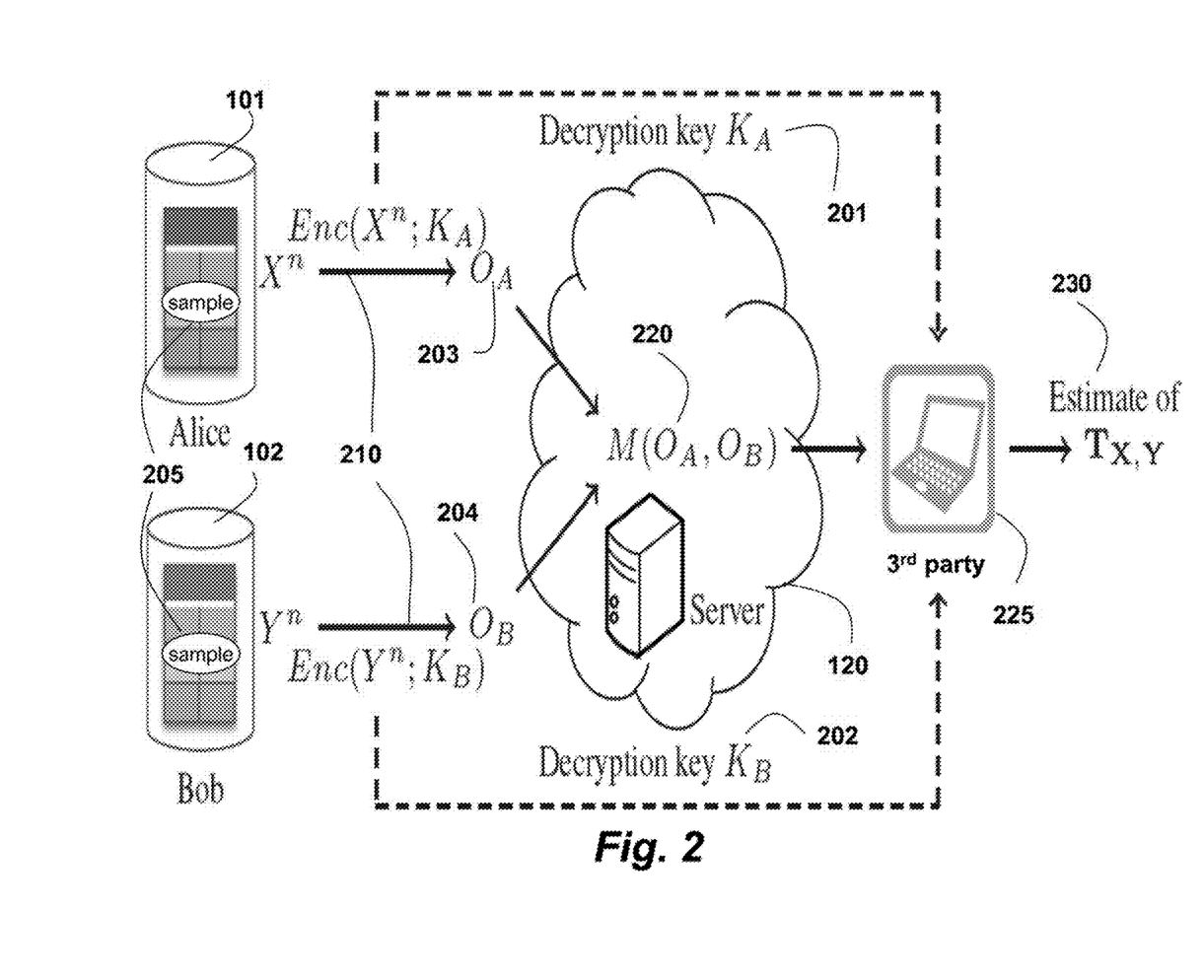
FIG. 2 and FIG. 3 are schematics of a system and method according to embodiments of the invention for deriving statistics from the data of FIG. 1 by a third party without compromising privacy of the data.

FIG. 2. shows the system and method framework of embodiments of our invention.

Database Model:

The data 101 maintained by Alice is modeled as a sequence $X^n:=(X_1, X_2, \ldots, X_n)$, with each X taking values in a finite-alphabet X. Likewise, Bob's data 102 are modeled as a sequence of random variables $Y^n:=(Y_1, Y_2, \ldots, Y_n)$, with each $Y_i$ taking values in a finite-alphabet Y. The length n of the sequences represents the total number of respondents in the database, and each $(X_i,Y_i)$ pair represents the data of the respondent i collectively maintained by Alice and Bob, with the alphabet X×Y representing the domain of the data of each respondent.

Data Processing and Release:

Each clients applies a data release mechanism to their respective data to produce an encryption of the data for the server and a decryption key for the third party. These mechanisms are denoted by the randomized mappings $F_A: X^n \to O_A \times K_A$ and $F_B: Y^n \to O_B \times K_B$, where $K_A$ 201 and $K_B$ 202 are suitable key spaces, and $O_B$ 203 and $O_A$ 204 are suitable encryption spaces. The encryptions and keys are produced and given by $$(O_A, K_A) := F_A(X^n),$$

$$(O_B, K_B) := F_B(Y^n).$$

The encryptions $O_A$ and $O_B$ are passed to the server, which performs processing, and the keys $K_A$ and $K_B$ are provided sent to the third party 225. The server processes $O_A$ and $O_B$, producing an output O via a random mapping $M: O_A \times O_B \to O$ 220, as given by $$O := M(O_A, O_B).$$

Statistical Recovery:

To enable the recovery of the statistics of the database, the processed output C) is provided to the third party via the server, and the encryption keys $K_A$ and $K_B$ are provided to the third party by the clients. The third party produces an estimate (^) of the joint type (empirical distribution) of Alice and Bob's data sequences, denoted by $\hat{T}_{X^n,Y^n}$ 250, as a function of O, $K_A$, and $K_B$, as given by $$\hat{T}_{X^n,Y^n} := g(O, K_A, K_B),$$

where $g: O \times K_A \times K_B \to [0,1]^{X \times Y}$ is a reconstruction function.

The object is to design a system within the above framework, by specifying the mappings $F_A$, $F_B$, M, and g, that optimize the system performance requirements, which are formulated below.

Privacy and Utility Conditions

We now formulate the privacy and utility requirements for our framework.

Privacy Against the Server:

During the course of system operation, the clients do not want reveal any information about their data to the server, not even aggregate statistics. A strong statistical condition that guarantees this security is the requirement of statistical independence between the data and the encrypted versions stored at the server. The statistical requirement of independence guarantees security even against an adversarial server with unbounded resources, and does not require any unproved assumptions.

Respondent Privacy:

The data should be kept private from all other parties, including any authorized third parties who attempts to recover the statistics. We formalize this notion using $\varepsilon$-differential privacy for the respondents as follows:

Given the above framework, the system provides $\varepsilon$-differential privacy if for all data $(x^n,y^n)$ and $(\dot{x}^n,\dot{y}^n)$ in $X^n \times Y^n$, within Hamming distance $d_H((x^n,y^n),(\dot{x}^n,\dot{y}^n)) \le 1$, and all S $\subseteq O \times K_A \times K_B$, $$Pr[(O,K_A,K_B) \in S | (X^n,Y^n)=(x^n,y^n)] \le e^\varepsilon Pr[(O,K_A,K_B) \in S | (X^n,Y^n)=(\dot{x}^n,\dot{y}^n)].$$

This rigorous definition of privacy satisfies the privacy axioms. Under the assumption that the data are i.i.d., this definition results in a strong privacy guarantee. An attacker with knowledge of all except one of the respondents cannot recover the data of the sole missing respondent.

Utility for Authorized Third Parties:

The utility of the estimate is measured by the expected $l_2$-norm error of this estimated type vector, given by $$E \| \hat{T}_{X^n,Y^n} - T_{X^n,Y^n} \|_2,$$

with the goal being the minimization of this error.

System Complexity:

The communication and computational complexity of the system are also of concern. The computational complexity can be represented by the complexity of implementing the mappings ($F_A$, $F_B$, M and g) that specify a given system. Ideally, we try to minimize the computational complexity of all of these mappings, and simplifying the operations that each party performs. The communication requirements is given by the cardinalities of the symbol alphabets ($O_A$, $O_B$, $K_A$, $K_B$, and O). The logarithms of these alphabet sizes indicate the sufficient length for the messages that must be transmitted in our system.

Proposed System and Analysis

We describe the details of our system, and analyze its privacy and utility performance. First, we describe how our system utilizes sampling and additive encryption, enabling the server to join and perturb encrypted data in order to facilitate the release of sanitized data to the third party. Next, we analyze the privacy of our system and show that our sampling enhances privacy, thereby reducing the amount of noise that is added during the perturbation step to obtain a desired level of privacy. Finally, we analyze the accuracy of the joint type reconstruction, producing a bound on the utility as a function of the system parameters, that is to say, the noise added during perturbation, and the sampling factor.

System Architecture

FIG. 2 shows the overall system, and the data sanitization and release procedure is outlined by the following steps:

1. Sampling: The clients respectively randomly sample 205 their data X and Y, producing shortened sequences $X_n$ and $Y_n$.

2. Encryption: The clients encrypt 210 the shortened sequence before passing the shortened sequences to the server.

3. Perturbation: The server combines and perturbs 220 the encrypted sequences.

4. Release: The third party processor 225 obtains the sanitized data from the server and the encryption keys from the clients, allowing the approximate recovery of data statistics $T_{X,Y}$ 230.

It is assumed that the clients, server and third party each have at least one processor to perform the steps outlined above. The processors are connected to memories, e.g., databases, and input/output interfaces for communicating with each other.

A key aspect of these steps is that the encryption and perturbation schemes commute, thus allowing the server to essentially perform perturbation on the encrypted sequences, and for the authorized third party to subsequently decrypt the perturbed data. In this section, we describe the details of each step from a theoretical perspective by applying mathematical abstractions and assumptions. Later, we describe practical implementations towards the realizing our system.

Another aspect of the invention is that the sequence of sampling, randomization and encryption can be altered so long as the encryption parameters are determined by the client processors and the decryption parameters are provided to the authorized third-party processor.

Figure 3:
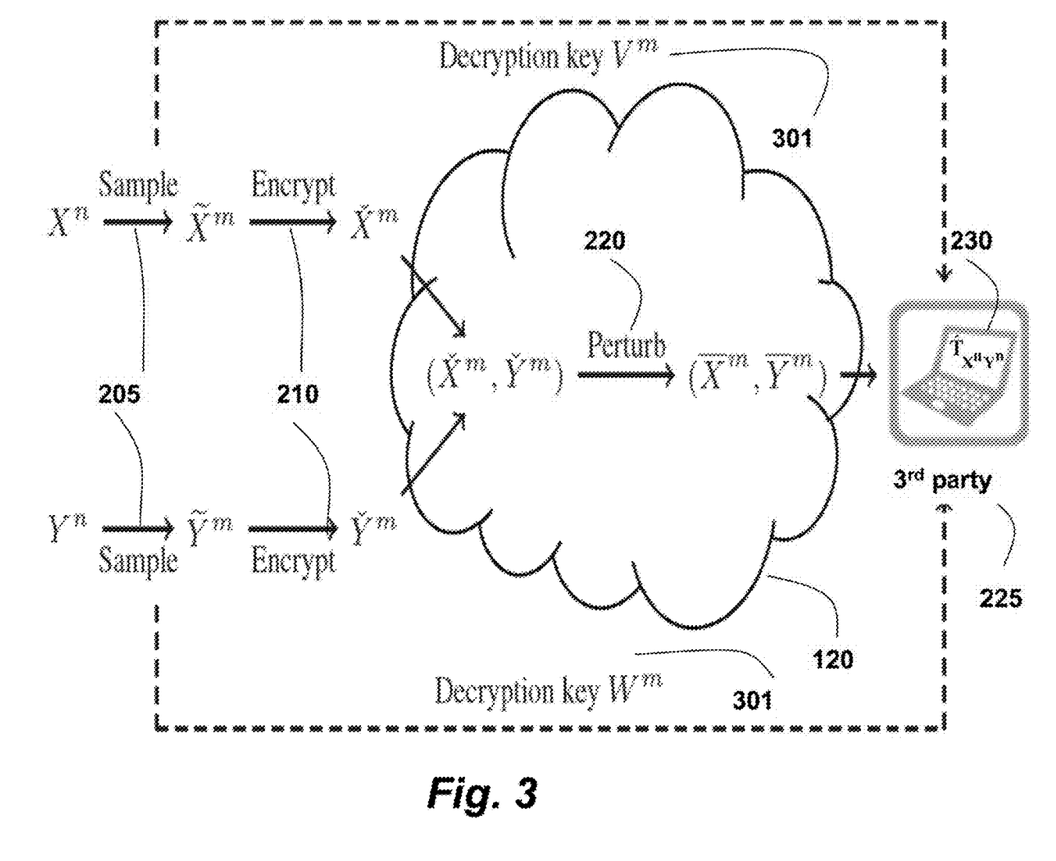

FIG. 3 shows the overall process using the abstractions.

Sampling:

The data clients sample 205 the data to reduced the length of database sequences ($X^n$, $Y^n$) to i randomly drawn samples, where m is substantially smaller than n. The samples are drawn uniformly without replacement and that both the clients sample at the same locations. We let $$(\tilde{X}^m, \tilde{Y}^m) := (\tilde{X}_1, \ldots \hat{X}_m, \tilde{Y}_1, \ldots, \tilde{Y}_m)$$

denote the intermediate result after sampling. Mathematically, the sampling result is described by $$(\tilde{X}_i, \tilde{Y}_i) = (X_{I_i}, Y_{I_i}) \text{ for all } i \in \{1, \ldots, m\},$$

where $I_1, \ldots, I_m$ are drawn uniformly without replacement from $\{1, \ldots, n\}$.

Encryption:

The clients independently encrypt 210 the sampled data sequences with an additive (one-time pad) encryption scheme. Alice uses an independent uniform key sequence $V^m \in X^m$ 301, and produces the encrypted sequence $$\check{X}^m := \tilde{X}^m \oplus V^m := (\tilde{X}_1 + V_1, \ldots, \tilde{X}_m + V_m),$$

where $\oplus$ denotes addition applied element-by-element over the sequences. The addition operation can be any suitably defined group addition operation over the finite set.

Similarly, Bob encrypts his data, with the independent uniform key sequence $W^m \in Y^m$ 302, to produce the encrypted sequence $$\check{Y}^m := \tilde{Y}^m \oplus W^m := (\tilde{Y}_1 + W_1, \ldots, \tilde{Y}_m + W_m).$$

Alice and Bob send these encrypted sequences to the server, and provide the keys to the third party to enable data release.

Perturbation:

The server joins the encrypted data sequences, forming $((\check{X}_1, \check{Y}_1), \ldots, (\check{X}_m, \check{Y}_m))$, and perturbs 220 the sequences by applying an independent PRAM mechanism, producing the perturbed results $(\overline{X}^m, \overline{Y}^m)$. Each joined and encrypted sample $(\check{X}_i, \check{Y}_i)$ is perturbed independently and identically according to a conditional distribution, $P_{\overline{X},\overline{Y}|X,Y}$ that specifies a random mapping from (X×Y) to (X×Y).

Using the matrix $A := P_{\overline{X},\overline{Y}|X,Y}$ to represent the conditional distribution, this operation can be represented by $$P_{\overline{X}^m, \overline{Y}^m|\check{X}^m, \check{Y}^m}(\overline{x}^m, \overline{y}^m | \check{x}^m, \check{y}^m) = \prod_{i=1}^{m} A[(\overline{x}_i, \overline{y}_i), (\check{x}_i, \check{y}_i)].$$

By design, we specify that A is a γ-diagonal matrix, for a parameter γ>1, given by $$A[(\overline{x}, \overline{y}), (\check{x}, \check{y})] := \begin{cases} \gamma/q, & \text{if } (\overline{x}, \overline{y}) = (\check{x}, \check{y}), \\ 1/q, & \text{otherwise,} \end{cases}$$

and
where $q := (\gamma + |X||Y| - 1)$ is a normalizing constant.

Figure 4:
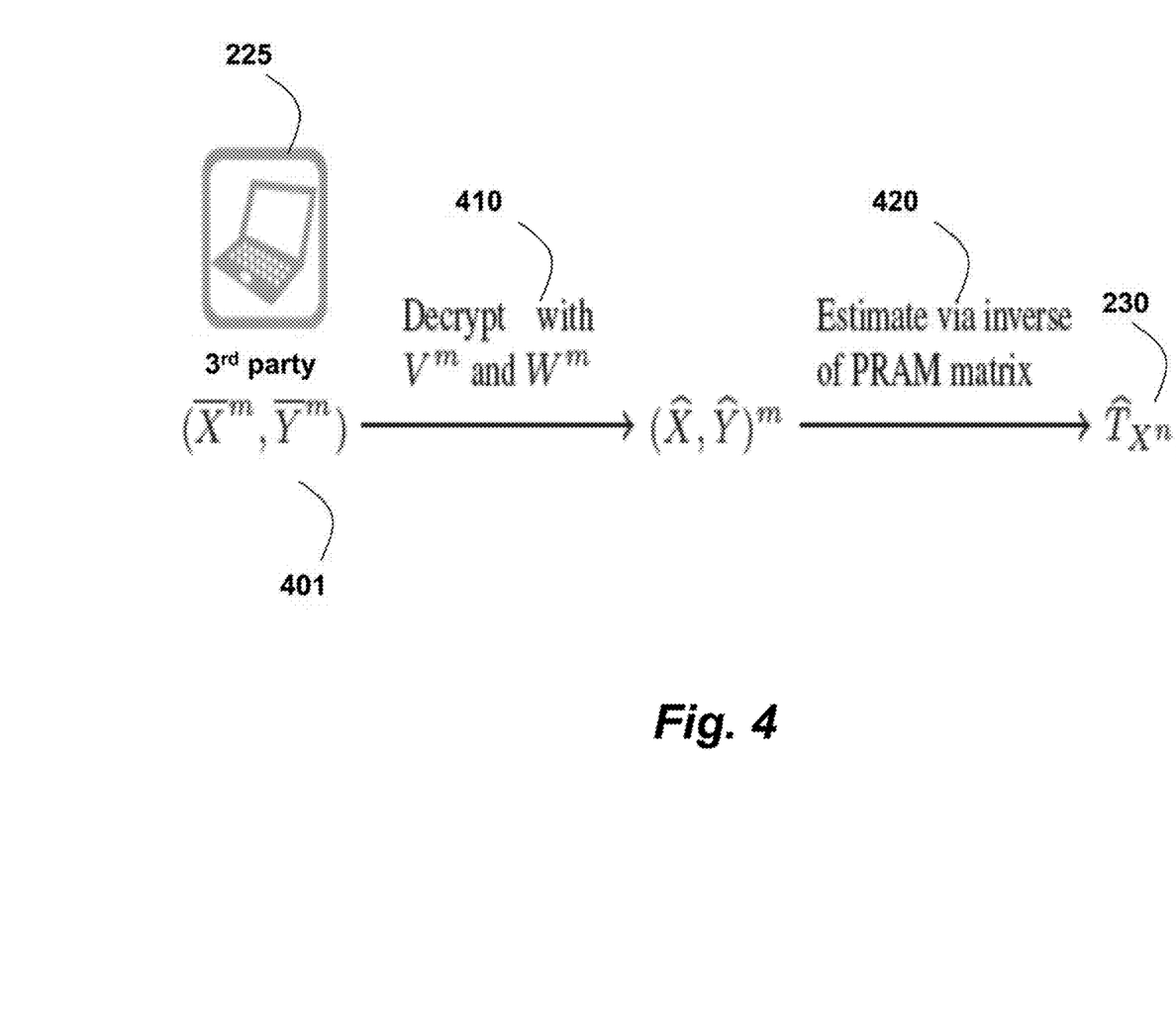
FIG. 4 is a schematic of a release operation to recover the statistics.

Release:

In order to recover the statistics as shown in FIG. 4, the third party obtains the sampled, encrypted, and perturbed data sequences $(\overline{X}^m, \overline{Y}^m)$ 401, from the server, and the encryption keys, $V^m$ and $W^m$, from the clients. The third party decrypts 410 and recovers the sanitized data given by $$(\hat{X}^m, \hat{Y}^m) := (\overline{X}^m \oplus V^m, \overline{Y}^m \oplus W^m),$$

which is effectively the data sanitized by the sampling and the PRAM. The third party produces the joint type estimate by inverting the matrix A and multiplying the matrix A with the joint type of the sanitized data as follows $$\hat{T}_{X^n, Y^n} := A^{-1} T_{\hat{X}^m, \hat{Y}^m}.$$

Due to the γ-diagonal property of the matrix A, the PRAM perturbation is essentially an additive operation that commutes with the additive encryption. This allows the server to perturb the encrypted data while preserving the perturbation when the encryption is removed. The decrypted, sanitized data $(\hat{X}^m, \hat{Y}^m)$ recovered by the third party are essentially the sampled data perturbed by the PRAM.

Sampling Enhances Privacy

We analyze the privacy of our system. Specifically, we show how sampling in conjunction with PRAM enhances the overall privacy for the respondents in comparison to using PRAM alone. Note that if PRAM, with the γ-diagonal matrix A, was applied alone to the full databases, the resulting perturbed data would have $\ln(\gamma)$-differential privacy. In the following, we show that the combination of sampling and PRAM results in sampled and perturbed data with enhanced privacy. Our system provides ε-differential privacy for the respondents, where $$\varepsilon = \ln\left(\frac{n + m(\gamma - 1)}{n}\right). \tag{1}$$

We use the following notation for the set of all possible samplings $$\Theta := \{\pi | \pi := (\pi_1, \ldots, \pi_m) \in \{1, \ldots, n\}^m, \pi_i \neq \pi_j, \forall i \neq j\}.$$

The sampling locations $(I_1, \ldots, I_m)$ are uniformly drawn from the set Θ. We define $\Theta_k := \{\pi \in \Theta | \exists i, \pi_i = k\}$ to denote the subset of samplings that select location k, and $\Theta_k^c := \Theta \setminus \Theta_k$ to denote the subset of samplings that do not select location k. For $\pi \in \Theta_k$.

We define $\Theta_k(\pi) := \{\pi' \in \Theta_k^c | d_H(\pi, \pi') = 1\}$ as the subset of $\Theta_k^c$ that replaces the selection of location k with any other non-selected location. We denote $\pi \in \Theta$ as a sampling function for the data sequences, that is, $\pi(X^n) := (X_{\pi_1}, \ldots, X_{\pi_m})$, and similarly for $\pi(Y^n)$. Using the above notation, we can rewrite the following conditional probability, $$P_{\hat{X}^m, \hat{Y}^m | X^n, Y^n}(\hat{x}^m, \hat{y}^m | x^n, y^n) =$$

$$\sum_{\pi \in \Theta} \frac{1}{|\Theta|} P_{\hat{X}^m, \hat{Y}^m | \check{X}^m, \check{Y}^m}(\hat{x}^m, \hat{y}^m | \pi(x^n), \pi(y^n)) =$$

$$\frac{1}{|\Theta|} \left[ \sum_{\pi \in \Theta_k} P_{\hat{X}^m, \hat{Y}^m | \check{X}^m, \check{Y}^m}(\hat{x}^m, \hat{y}^m | \pi(x^n), \pi(y^n)) + \sum_{\pi' \in \Theta_k^c} P_{\hat{X}^m, \hat{Y}^m | \check{X}^m, \check{Y}^m}(\hat{x}^m, \hat{y}^m | \pi'(x^n), \pi'(y^n)) \right] =$$

-continued $$\frac{1}{|\Theta|}\left[\sum_{\pi\in\Theta_k} P_{\hat{X}^m,\hat{Y}^m|\tilde{X}^m,\tilde{Y}^m}(\hat{x}^m,\hat{y}^m\mid\pi(x^n),\pi(y^n))+\frac{1}{m}\sum_{\pi'\in\Theta_k(\pi)} P_{\hat{X}^m,\hat{Y}^m|\tilde{X}^m,\tilde{Y}^m}(\hat{x}^m,\hat{y}^m\mid\pi'(x^n),\pi'(y^n))\right],$$

where in the last equality we have rearranged the summations to embed the summation over $\pi'\in\Theta_k^c$ into the summation over $\pi\in\Theta_k$.

Note that summing over all $\pi'\in\Theta_k(\pi)$ within a summation over all $\pi\in\Theta_k$ covers all $\pi'\in\Theta_k^c$, but overcounts each $\pi'$ exactly m times because each $\pi'\in\Theta_k^c$ belongs to m of the $\Theta_k(\pi)$ sets across all $\pi\in\Theta_k$. Hence, a $(1/m)$ term has been added to account for this overcount.

For the above expansion, we use the following shorthand notation for the summation terms:

$$\alpha(\pi):=P_{\hat{X}^m,\hat{Y}^m|\tilde{X}^m,\tilde{Y}^m}(\hat{x}^m,\hat{y}^m\mid\pi(x^n),\pi(y^n))$$

$$\beta(\pi):=P_{\hat{X}^m,\hat{Y}^m|\tilde{X}^m,\tilde{Y}^m}(\hat{x}^m,\hat{y}^m\mid\pi(\dot{x}^n),\pi(\dot{y}^n))$$

Thus, the probability ratio can be written as $$\frac{P_{\hat{X}^m,\hat{Y}^m|X^n,Y^n}(\hat{x}^m,\hat{y}^m\mid x^n,y^n)}{P_{\hat{X}^m,\hat{Y}^m|X^n,Y^n}(\hat{x}^m,\hat{y}^m\mid\dot{x}^n,\dot{y}^n)} =$$

$$\frac{\sum_{\pi\in\Theta_k}\left(\alpha(\pi)+\frac{1}{m}\sum_{\pi'\in\Theta_k(\pi)}\alpha(\pi')\right)}{\sum_{\pi\in\Theta_k}\left(\beta(\pi)+\frac{1}{m}\sum_{\pi'\in\Theta_k(\pi)}\beta(\pi')\right)} \le \max_{\pi\in\Theta_k}\frac{\alpha(\pi)+\frac{1}{m}\sum_{\pi'\in\Theta_k(\pi)}\alpha(\pi')}{\beta(\pi)+\frac{1}{m}\sum_{\pi'\in\Theta_k(\pi)}\beta(\pi')} =$$

$$\frac{\alpha(\pi^*)+\frac{1}{m}\sum_{\pi'\in\Theta_k(\pi^*)}\alpha(\pi')}{\beta(\pi^*)+\frac{1}{m}\sum_{\pi'\in\Theta_k(\pi^*)}\beta(\pi')},$$

where $\pi^*\in\Theta_k$ denotes the sampling that maximizes the ratio. Given the $\gamma$-diagonal structure of the matrix A, we have that $$\gamma^{-1}\alpha(\pi^*)\le\beta(\pi^*),$$

because $(\pi^*(x^n),\pi^*(y^n))$ and $(\pi^*(\dot{x}^n),\pi^*(\dot{y}^n))$ differ in only one location, $$\gamma^{-1}\alpha(\pi^*)\le\alpha(\pi'),\forall\pi'\in\Theta_k(\pi^*),$$

because $(\pi^*(x_n),\pi^*(y^n))$ and $(\pi'(x^n),\pi'(y^n))$ differ in only one location, and $$\alpha(\pi')=\beta(\pi'),\forall\pi'\in\Theta_k(\pi^*),$$

because $(\pi'(x^n),\pi'(y^n))=(\pi'(\dot{x}^n),\pi'(\dot{y}^n))$. Given these constraints, we can bound the likelihood ratio as $$\frac{P_{\hat{X}^m,\hat{Y}^m|X^n,Y^n}(\hat{x}^m,\hat{y}^m\mid x^n,y^n)}{P_{\hat{X}^m,\hat{Y}^m|X^n,Y^n}(\hat{x}^m,\hat{y}^m\mid\dot{x}^n,\dot{y}^n)} \le \frac{\alpha(\pi^*)+\frac{1}{m}\sum_{\pi'\in\Theta_k(\pi^*)}\alpha(\pi')}{\beta(\pi^*)+\frac{1}{m}\sum_{\pi'\in\Theta_k(\pi^*)}\beta(\pi')} \le$$

$$\frac{\alpha(\pi^*)+\frac{n-m}{m}\gamma^{-1}\alpha(\pi^*)}{\gamma^{-1}\alpha(\pi^*)+\frac{n-m}{m}\gamma^{-1}\alpha(\pi^*)} = \frac{n+m(\gamma-1)}{n} = e^\varepsilon,$$

by bounding the likelihood ratio with $e^\varepsilon$.

To show $\varepsilon$-differential privacy for a given $\varepsilon$, we only need to upperbound the probability ratio by $e^\varepsilon$, as done above. A natural question is if this bound is tight, that is, whether there exists a smaller $\varepsilon$ for which the bound also holds, hence making the system more private. The following example shows that the value for $\varepsilon$ is tight.

Example

Let a and b be two distinct elements in $(X\times Y)$. Let $(x^n,y^n)=(b,a,a,\ldots,a)$, $(\dot{x}^n,\dot{y}^n)=(a,a,\ldots,a)$ and $(x^m,y^m)=(b,b,\ldots,b)$. Let E denote the event that the first element (where the two databases differ) is sampled, which occurs with probability $(m/n)$. We can determine the likelihood ratio as follows $$\frac{P_{\hat{X}^m,\hat{Y}^m|X^n,Y^n}(\hat{x}^m,\hat{y}^m\mid x^n,y^n)}{P_{\hat{X}^m,\hat{Y}^m|X^n,Y^n}(\hat{x}^m,\hat{y}^m\mid\dot{x}^n,\dot{y}^n)} =$$

$$\frac{Pr[E]\gamma(1/q)^m+(1-Pr[E])(1/q)^m}{(1/q)^m} = \frac{n+m(\gamma-1)}{n} = e^\varepsilon.$$

Thus, the value of $\varepsilon$ is indeed tight.

Because of the privacy analysis for given system parameters of database size n, number of samples m, and desired level privacy $\varepsilon$, the level of PRAM perturbation, specified by the $\gamma$ parameter of the matrix A, is $$\gamma = 1 + \frac{n}{m}(e^\varepsilon - 1). \qquad (2)$$

Privacy against the server is obtained as a consequence of the one-time-pad encryption 210 performed on the data before the transmission to the server. The encryptions received by the server are statistically independent of the original database as a consequence of the independence and uniform randomness of the keys.

Utility Analysis

In this subsection, we analyze the utility of our system. Our main result is a theoretical bound on the expected $l_2$-norm of the joint type estimation error. Analysis of this bound indicates the tradeoffs between utility and privacy level $\varepsilon$ as function of sampling parameter in and PRAM perturbation level $\gamma$. Given this error bound, we can compute the optimal sampling parameter m for minimizing the error bound while achieving a fixed privacy level $\varepsilon$.

For our system, the expected $l_2$-norm of the joint type estimate is bounded by $$E\|\hat{T}_{X^n,Y^n} - T_{X^n,Y^n}\|_2 \le \frac{c\sqrt{|X||Y|}+1}{\sqrt{m}}. \qquad (3)$$

where c is the condition number of the $\gamma$-diagonal matrix A, given by $$c = 1 + \frac{|X||Y|}{\gamma - 1}.$$

Applying the triangle inequality, we can bound the error as the sum of the error introduced by sampling and the error introduced by PRAM, as follows, $$E\|A^{-1}T_{\hat{X}^m,\hat{Y}^m} - T_{X^n,Y^n}\|_2 \leq E\|T_{\tilde{X}^m,\tilde{Y}^m} - T_{X^n,Y^n}\|_2 + E\|A^{-1}T_{\hat{X}^m,\hat{Y}^m} - T_{\tilde{X}^m,\tilde{Y}^m}\|_2.$$

We analyze and bound the sampling error, $$E\|T_{\tilde{X}^m,\tilde{Y}^m} - T_{X^n,Y^n}\|_2,$$

by bounding the conditional expectation $$E[\|T_{\tilde{X}^m,\tilde{Y}^m} - T_{X^n,Y^n}\|_2 | T_{X^n,Y^n}].$$

For a given $(x,y) \in X \times Y$, the sampled type, $T_{\tilde{X}^m,\tilde{Y}^m}(x,y)$, conditioned on $T_{X^n,Y^n}$, is a hypergeometric random variable normalized by m, with expectation and variance given by $$E[T_{\tilde{X}^m,\tilde{Y}^m}(x,y) | T_{X^n,Y^n}] = T_{X^n,Y^n}(x,y),$$

$$\text{Var}[T_{\tilde{X}^m,\tilde{Y}^m}(x,y) | T_{X^n,Y^n}] = \frac{nT_{X^n,Y^n}(x,y)(n - nT_{X^n,Y^n}(x,y))(n-m)}{mn^2(n-1)} \leq \frac{T_{X^n,Y^n}(x,y)}{m}.$$

Applying Jensen's inequality to the conditioned sampling error yields $$E[\|T_{\tilde{X}^m,\tilde{Y}^m} - T_{X^n,Y^n}\|_2 | T_{X^n,Y^n}] \leq \sqrt{\sum_{(x,y) \in X \times Y} \text{Var}[T_{\tilde{X}^m,\tilde{Y}^m}(x,y) | T_{X^n,Y^n}]} \leq \frac{1}{\sqrt{m}}.$$

Applying the smoothing theorem, the sampling error can be bounded by $$E\|T_{\tilde{X}^m,\tilde{Y}^m} - T_{X^n,Y^n}\|_2 = E_{T_{X^n,Y^n}}[E[\|T_{\tilde{X}^m,\tilde{Y}^m} - T_{X^n,Y^n}\|_2 | T_{X^n,Y^n}]] \leq \frac{1}{\sqrt{m}}.$$

Next, to analyze and bound the PRAM error given by $$E\|A^{-1}T_{\hat{X}^m,\hat{Y}^m} - T_{\tilde{X}^m,\tilde{Y}^m}\|_2,$$

we use the following linear algebra.

Let A be an invertible matrix and (x,y) be vectors that satisfy Ax=y. For any vectors $(\hat{x}, \hat{y})$ such that $\hat{x} = A^{-1}\hat{y}$, we have $$\frac{\|\hat{x} - x\|}{\|x\|} \leq c\frac{\|\hat{y} - y\|}{\|y\|},$$

where c is the condition number of the matrix A.

To bound the PRAM error, we use the following consequence, $$\|A^{-1}T_{\hat{X}^m,\hat{Y}^m} - T_{\tilde{X}^m,\tilde{Y}^m}\|_2 \leq c\frac{\|T_{\tilde{X}^m,\tilde{Y}^m}\|_2}{\|AT_{\tilde{X}^m,\tilde{Y}^m}\|_2}\|T_{\hat{X}^m,\hat{Y}^m} - AT_{\tilde{X}^m,\tilde{Y}^m}\|_2,$$

which allows us to bound the conditional expectation of the PRAM error as follows, $$E[\|A^{-1}T_{\hat{X}^m,\hat{Y}^m} - T_{\tilde{X}^m,\tilde{Y}^m}\|_2 | T_{\tilde{X}^m,\tilde{Y}^m}] \leq c\frac{\|T_{\tilde{X}^m,\tilde{Y}^m}\|_2}{\|AT_{\tilde{X}^m,\tilde{Y}^m}\|_2}E[\|T_{\hat{X}^m,\hat{Y}^m} - AT_{\tilde{X}^m,\tilde{Y}^m}\|_2 | T_{\tilde{X}^m,\tilde{Y}^m}].$$

For $(x,y) \in X \times Y$, the perturbed and sampled type $T_{\hat{X}^m,\hat{Y}^m}(x,y)$, conditioned on $T_{\tilde{X}^m,\tilde{Y}^m}$, is a Poisson-binomial random variable normalized by m with expectation and variance given by $$E[T_{\hat{X}^m,\hat{Y}^m}(x,y) | T_{\tilde{X}^m,\tilde{Y}^m}] = (AT_{\tilde{X}^m,\tilde{Y}^m})[x,y],$$

$$\text{Var}[T_{\hat{X}^m,\hat{Y}^m}(x,y) | T_{\tilde{X}^m,\tilde{Y}^m}] = \frac{1}{m}\sum_{(x',y') \in X \times Y} T_{\tilde{X}^m,\tilde{Y}^m}(x',y')A[(x,y),(x',y')](1 - A[(x,y),(x',y')]).$$

We can bound the following conditional expectation using Jensen's inequality to yield $$E[\|T_{\hat{X}^m,\hat{Y}^m} - AT_{\tilde{X}^m,\tilde{Y}^m}\|_2 | T_{\tilde{X}^m,\tilde{Y}^m}] \leq \sqrt{\sum_{(x,y) \in X \times Y} \text{Var}[T_{\hat{X}^m,\hat{Y}^m}(x,y) | T_{\tilde{X}^m,\tilde{Y}^m}]} =$$

$$\left[\frac{1}{m}\sum_{(x,y) \in X \times Y}\sum_{(x',y') \in X \times Y} T_{\tilde{X}^m,\tilde{Y}^m}(x',y')A[(x,y),(x',y')](1 - A[(x,y),(x',y')])\right]^{1/2} \leq$$

$$\left[\frac{1}{m}\sum_{(x',y') \in X \times Y} T_{\tilde{X}^m,\tilde{Y}^m}(x',y')\sum_{(x,y) \in X \times Y} A[(x,y),(x',y')]\right]^{1/2} = \frac{1}{\sqrt{m}}.$$

Combining equations yields the bound $$E[\|A^{-1}T_{\hat{X}^m,\hat{Y}^m} - T_{\tilde{X}^m,\tilde{Y}^m}\|_2 | T_{\tilde{X}^m,\tilde{Y}^m}] \leq \quad (4)$$

$$\frac{c}{\sqrt{m}}\frac{\|T_{\tilde{X}^m,\tilde{Y}^m}\|_2}{\|AT_{\tilde{X}^m,\tilde{Y}^m}\|_2} \leq \frac{c}{\sqrt{m}}\frac{\sqrt{|X||Y|}\|T_{\tilde{X}^m,\tilde{Y}^m}\|_1}{\|AT_{\tilde{X}^m,\tilde{Y}^m}\|_1} = c\sqrt{\frac{|X||Y|}{m}},$$

which, upon applying the smoothing yields the following bound on the PRAM error $$E[\|A^{-1}T_{\hat{X}^m,\hat{Y}^m} - T_{\tilde{X}^m,\tilde{Y}^m}\|_2] =$$

$$E_{T_{\tilde{X}^m,\tilde{Y}^m}}[E[\|A^{-1}T_{\hat{X}^m,\hat{Y}^m} - T_{\tilde{X}^m,\tilde{Y}^m}\|_2 | T_{\tilde{X}^m,\tilde{Y}^m}]] \leq c\sqrt{\frac{|X||Y|}{m}}.$$

Combining the individual bounds on the sampling and PRAM error via the triangle inequality yields the following bound on expected norm-2 error of the type estimate formed from the sampled and perturbed data.

$$E\|A^{-1}T_{\hat{X}^m,\hat{Y}^m} - T_{X^n,Y^n}\|_2 \leq \frac{c\sqrt{|X||Y|} + 1}{\sqrt{m}}.$$

Because A is a γ-diagonal matrix, its condition number c is given by $$c = 1 + \frac{|\mathcal{X}||\mathcal{Y}|}{\gamma - 1}.$$

Optimal Sampling Parameter m*

Given a fixed PRAM perturbation parameter γ, the error bound decays on the order of $O(1/\sqrt{m})$ as a function of the sampling parameter m. However, as m increases, ε as given in Equation (1) also increases, decreasing privacy. However, when we fix the overall privacy level ε, by adjusting γ as a function of m, as given by Equation (2), to maintain the desired level of privacy, we observe that increasing m too much causes the error bound to expand, see FIG. 5.

Intuitively, this can be explained as by having in too large, we need to increase the PRAM perturbation through lowering γ to maintain the same level of privacy, which has the adverse effect of increasing the error bound through the condition number c.

Figure 5:
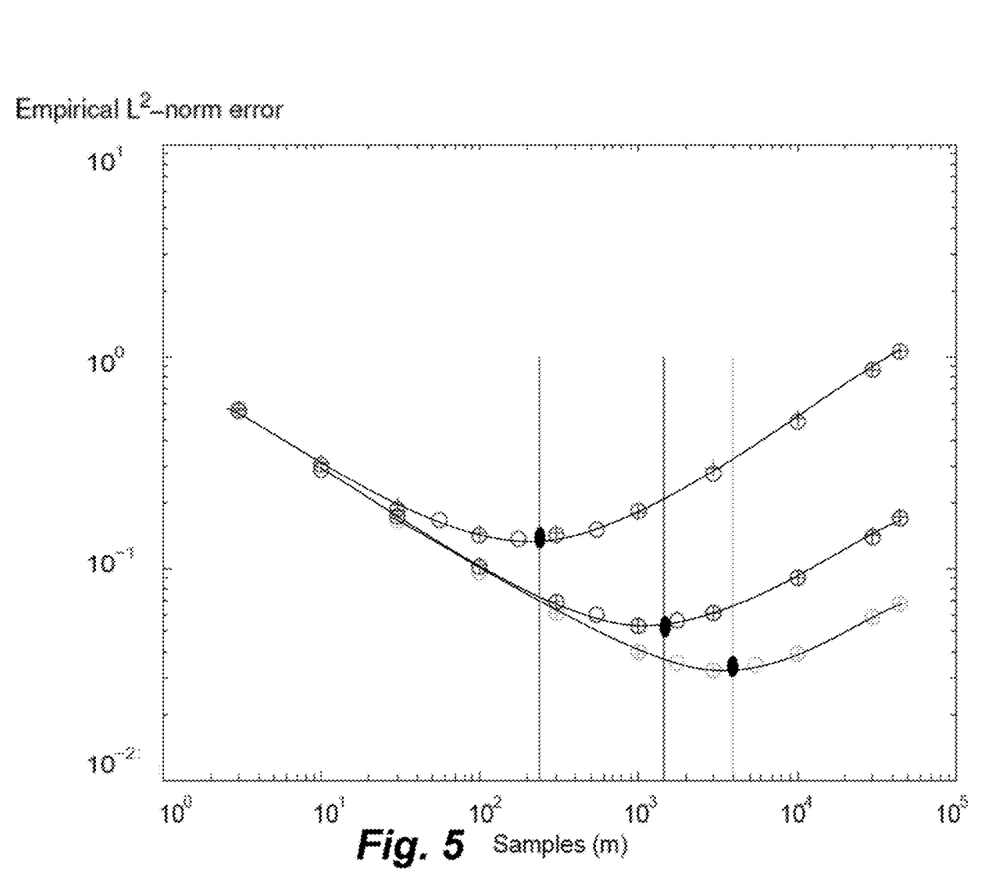
FIG. 5 is a graph of an expected $l_2$ norm error as a function of number of samples for three privacy levels.

On the other hand, by having m too small, too few samples are taken resulting in an inaccurate type estimate, see FIG. 5. This balance in adjusting the sampling parameter m shows that there is an optimal sample size m as a function of the desired level of privacy ε and other system parameters, see FIG. 5.

The theoretically optimal sample size m* for the error upper bound is given by the following. The optimal sampling parameter m* that optimizes the error bound of Equation (3) is $$m^* = \frac{n(1 + \sqrt{|\mathcal{X}||\mathcal{Y}|})(e^\varepsilon - 1)}{(|\mathcal{X}||\mathcal{Y}|)^{\frac{3}{2}}}. \quad (6)$$

FIG. 5 shows experimental results of for three privacy levels (ε) as a function of number of samples m. Each data point represents the expected $l_2$ norm of the type error estimated as the empirical mean over 1000 independent experiments. with synthetic data with a "uniform" distribution. The three vertical lines indicate theoretically optimal number of samples at each respective privacy level.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for securely communicating aggregate statistics on private data to mutually untrusting Internet parties, comprising:
    one or more client devices, wherein the one or more client devices sample data $X^n$ and $Y^n$ to obtain sampled data $\tilde{X}^m$ and $\tilde{Y}^m$, wherein m is a sampling parameter smaller than a length n of the data, and encrypt the sampled data $\tilde{X}^m$ and $\tilde{Y}^m$ with encryption keys to obtain encrypted data $\check{X}^m$ and $\check{Y}^m$;
    a server in Internet communication with the one or more client devices, wherein the server receives the encrypted data $\check{X}^m$ and $\check{Y}^m$ from the one or more client devices, combines the encrypted data $\check{X}^m$ and $\check{Y}^m$ to obtain combined encrypted data, randomizes the combined encrypted data using a post randomization (PRAM) to obtain randomized encrypted data $\overline{X}^m, \overline{Y}^m$, and transmits the randomized encrypted data $\overline{X}^m, \overline{Y}^m$ in response to receiving an Internet request for the data $X^n$ and $Y^n$;
    an authorized third-party processor in Internet communication with the server and with the one or more client devices, wherein the authorized third-party processor, in response to transmitting the Internet request for the data $X^n$ and $Y^n$ to the server, receives from the server the randomized encrypted data $\overline{X}^m$, $\overline{Y}^m$, receives, in response to transmitting an Internet request to the one or more client devices, from the one or more client devices decryption keys corresponding to the encryption keys, decrypts the randomized encrypted data $\overline{X}^m$, $\overline{Y}^m$ with the decryption keys to produce randomized data, and estimates a joint distribution $\hat{T}_{X^n,Y^n}$ of the data $X^n$ and $Y^n$ from the randomized data to produce the aggregate statistics on the data $X^n$ and $Y^n$, such that a differential privacy on the data $X^n$ and $Y^n$ is a function of the sampling parameter m and a differential privacy of the PRAM γ satisfying a differential privacy requirement according to $$\varepsilon = \ln\left(\frac{n + m(\gamma - 1)}{n}\right),$$

wherein ε is the differential privacy, m is the sampling parameter, the PRAM includes γ-diagonal matrix A, and ln( ) is a logarithmic function.

2. The system off claim 1, wherein the encryption is performed before the sampling at the one or more client devices.

3. The system of claim 1, wherein the randomizing is performed by the one or more client devices.

4. The system of claim 1, wherein the encrypted data X' and Y'" is obtained from the sampled data X''' and Y''' using a stream cipher, and decryption parameters for the stream cipher are provided to the authorized third-party processor.

5. The system of claim 4, wherein the estimating further comprises: reversing, at the authorized third-party processor, the encryption applied to the randomized data X m, Ym, using decryption parameters provided to the authorized third-party processor by the one or more client devices.

6. The system of claim 1, wherein the randomized data X is obtained from the encrypted data X' and Y' using a randomized response mechanism.

7. The system of claim 1, wherein the one or more client devices perform the sampling, encrypting and randomizing, and the authorized third-party processor performs the combining and estimating.

8. The system of claim 1, wherein the sampling, randomizing and encrypting can be in any order as long as encrypting parameters are determined by the one or more client devices, and decrypting parameters are provided to the authorized third-party processor.

9. A system for securely communicating aggregate statistics on private data to mutually untrusting parties, comprising: one or more client devices including processors configured to sample first data and second data to obtain sampled data, wherein a sampling parameter is smaller than a length of the data, and encrypt the sampled data to obtain encrypted data; a server in Internet communication with the one or more client devices, wherein the server receives the encrypted data from one or more client devices, combines the encrypted data to obtain combined encrypted data, randomizes the combined encrypted data using a post randomization (PRAM) to obtain randomized encrypted data and transmits the randomized encrypted data upon receiving a request for the first data and the second data; an authorized third-party processor in Internet communication with the server and with the one or more client devices, wherein the authorized third party processor estimates a joint distribution of the first data and the second data from the randomized encrypted data received from the server decrypted with decryption keys received from the one or more client devices to produce the aggregate statistics on the first data and the second data such that a differential privacy of the first data and the second data is a function of the sampling parameter m and a differential privacy of the PRAM γ satisfying a differential privacy requirement according to $$\varepsilon = \ln\left(\frac{n + m(\gamma - 1)}{n}\right),$$

wherein ε is the differential privacy, m is the sampling parameter, the PRAM includes γ-diagonal matrix A, and ln( ) is a logarithmic function.

10. The system of claim 1, wherein the randomized data is obtained for the encrypted data using a randomized response mechanism wherein the randomized response mechanism further comprises: independently altering each data element to any other values in an alphabet set with the same probability, or alternatively retaining a value of said each data element.

11. The system of claim 1, wherein the one or more client devices perform the encrypting, and the server performs the combining, sampling, and randomizing.

\* \* \* \* \*